(12) United States Patent
Alston et al.

(10) Patent No.: US 6,807,255 B1
(45) Date of Patent: Oct. 19, 2004

(54) SYSTEMS AND METHODS FOR EXCHANGING WIRELINE MESSAGES WITH WIRELINE TELEPHONES

(75) Inventors: Douglas B. Alston, Fayetteville, GA (US); Anita Hogans Simpson, Decatur, GA (US)

(73) Assignee: BellSouth Intellectual Property Corporation, Wilmington, DE (US)

(*) Notice: Subject to any disclaimer, the term of this patent is extended or adjusted under 35 U.S.C. 154(b) by 128 days.

(21) Appl. No.: 10/153,211

(22) Filed: May 21, 2002

(51) Int. Cl.[7] ............................................. H04M 1/64
(52) U.S. Cl. .................... 379/88.11; 379/207.02; 379/221.09
(58) Field of Search ................. 379/201.01, 221.09, 379/221.08, 221.12, 207.02, 88.11, 88.17; 455/466

(56) References Cited

U.S. PATENT DOCUMENTS

| | | | |
|---|---|---|---|
| 5,742,905 A | * 4/1998 | Pepe et al. | 455/461 |
| 5,852,657 A | 12/1998 | Malik et al. | 379/93.25 |
| 6,018,577 A | 1/2000 | Roach, Jr. | 379/229 |
| 6,085,101 A | * 7/2000 | Jain et al. | 455/500 |
| 6,366,791 B1 | 4/2002 | Lin et al. | 455/567 |
| 6,404,880 B1 | * 6/2002 | Stevens | 379/221.11 |
| 6,418,330 B1 | 7/2002 | Lee | 455/567 |

* cited by examiner

Primary Examiner—Creighton Smith
(74) Attorney, Agent, or Firm—Merchant & Gould (57) ABSTRACT

A system configured to deliver wireline messages to terminating stations, such as telephones, using a conventional public switched telephone network (PSTN). The wireline messages may be composed of text, ring tones, or other items. The wireline messages may be created using modified conventional telephones, mobile telephones, personal computers and the like. The wireline messages are stored within a wireline message database associated with a conventional service control point (SCP) contained in an Advanced Intelligent Network (AIN). The wireline messages are delivered to a terminating station, such as a wireline telephone, after a trigger has been actuated. Wireline messages composed of text are displayed on a display screen incorporated within the terminating station or electrically coupled to the terminating station. Wireline messages composed of ring tones are played to alert a called party that an incoming call has been placed from a particular directory number.

19 Claims, 6 Drawing Sheets

SYSTEMS AND METHODS FOR EXCHANGING WIRELINE MESSAGES WITH WIRELINE TELEPHONES

RELATED APPLICATIONS

This Application is related to U.S. Application No. TBD, entitled, Telecommunications Device Ring Tone Apparatuses, Systems and Methods, and U.S. Application No. TBD, entitled, Systems and Methods for Wireline Ring Tone Service, filed concurrently herewith.

FIELD OF THE INVENTION

The invention is directed generally to systems and methods for providing wireline messages to terminating stations, such as telephones, and more particularly, to systems and methods for providing wireline messages, such as text messages, ring tones and the like, to slightly modified conventional telephones using conventional telecommunications infrastructure.

BACKGROUND

The public switched telephone network (PSTN) has been in existence for many years and has been the primary network supporting the conventional telephone system. Until recently, the PSTN has been used exclusively for transmitting verbal communications between users at two or more terminating stations, such as telephones, positioned in different geographic locations. While the PSTN continues to be used for transmitting verbal communications, use of the PSTN has expanded greatly within the past twenty years to include data transmission between computers, internet support, and other such applications.

During evolution of the PSTN, the mobile communications network simultaneously evolved to support primarily mobile telephones and other verbal communication devices. The mobile communications network evolved very similarly to the PSTN, except that the mobile communications network experienced change at a much faster pace than the PSTN. For instance, the mobile communications network was first developed as a collection of towers covering individual geographic areas, referred to as cells, for transmitting verbal communications electronically between two mobile telephones or between a mobile telephone and a wireline telephone. Mobile communication devices were quickly reconfigured to enable users to send and transmit data across the mobile communications network using modems and other such devices. Shortly thereafter, text messaging, referred to as short message service (SMS), was developed for sending short text messages to mobile communication devices. These short messages were designed as a reliable way for sending short messages or reminders to colleagues, friends and others. At the time, SMS was limited to messages consisting only of alpha-numeric characters.

Recently, SMS evolved into a system, commonly referred to as enhanced messaging service (EMS), that is capable of sending ring tones, operator logos, and other simple visual messages to EMS compliant mobile devices. EMS compliant mobile telephones also have the ability to send and receive a combination of simple media items, such as melodies, pictures, sounds, animations, modified text and standard text as an integrated message for viewing on display screens. Both SMS and EMS allow users to receive and view messages on a mobile device in many geographic locations. However, SMS and EMS are effective methods of communication only if the intended recipient is using the mobile device. If the intended recipient is not using the mobile device, then the intended recipient does not receive the message. In addition, an intended recipient cannot receive a communication if the recipient is in an area that does not support mobile communications, such as a rural area without mobile communication towers.

Although mobile telephones are used regularly by a portion of society, usage of mobile telephones vary from person to person based on a variety of factors. For instance, some individuals use mobile telephones as their primary means of communication, while others use mobile telephones sporadically or not at all. As a result, the likelihood of contacting someone through a mobile telephone varies as well. Thus, using SMS and EMS on mobile telephones is not always a reliable method of communicating with someone. In addition, even frequent users of mobile telephones often have portions of a typical day in which they are not in contact with their mobile telephones, such as when they are at work or at home after work, on a weekend or on a holiday. Thus, senders often cannot be sure that the intended recipient will see a message promptly.

In many instances, a wireline telephone is available to the intended recipient when a mobile telephone is unavailable. Thus, a need exists for a system and method for sending messages, composed of text, audio messages and the like, to wireline devices that are capable of receiving these messages.

SUMMARY OF THE INVENTION

Set forth below is a brief summary of systems and methods according to the invention that address the foregoing problems and provide benefits and advantages in accordance with the purposes of the present invention as embodied and broadly described herein. According to one aspect, this invention is directed to a system for providing wireline messages to a terminating station, such as a telephone, across a conventional public switched telecommunications network (PSTN). The wireline messages may include text messages, ring tones and other items and may be created through a variety of sources, such as personal computers, mobile telephones, wireline telephones, modems, and other such devices. Wireline messages are stored within a wireline messages database associated with a service control point (SCP) of a conventional Advanced Intelligent Network (AIN). The wireline message database stores wireline messages and associates each message with either a called directory number or a calling directory number.

In one embodiment, wireline messages composed of text messages are delivered to a terminating station using the conventional PSTN. The process of sending a wireline message to a directory number includes sending the wireline message to a service switching point (SSP) if the wireline message is created using an originating station coupled to the SSP, such as a telephone, or sending the wireline message through another system, such as a mobile network, if the wireline message is created using a wireless telephone or the like. Regardless of the path through which the wireline message is initially routed, the wireline message is sent to a message server as an email message or a SMS using a unique address. The message server sends the wireline message to a service node that is configured as an Internet Gateway with both signaling and voice path interfaces.

The service node receives the wireline message and determines whether the terminating directory number associated with the wireline message is a subscriber of the wireline text service. In one embodiment, this is accomplished by the service node sending a query to the SCP to access a directory within the wireline message database containing a list of directory numbers subscribing to the wireline text service. If the wireline message database contains the directory number, then the SCP sends a response to the service node instructing the service node to send the wireline message to the wireline message database. Otherwise, the SCP sends a response to the service node instructing the service node to delete the message and send a message to the calling party indicating that the wireline message is undeliverable because the directory number is not associated with a subscriber of the wireline text system.

After a wireline message has been created and sent to a directory number associated with a subscriber of the wireline message system, the wireline message is stored within the wireline message database for a very brief period of time until a trigger, such as a conventional terminating attempt trigger (TAT), is actuated. After the wireline message is stored within the wireline message database, the service node initiates a telephone call to the wireline message terminating directory number. The TAT is actuated upon a service switching point receiving the telephone call from the service node. Actuating the trigger causes the wireline message stored in the wireline database associated with the SCP to be sent to a terminating station in the following manner.

When a call is placed to a directory number from the service node, the call is first received by a SSP. The call is held at the SSP, and a digital data message is created and sent to the SCP through a STP. The SCP searches the wireline message database for wireline messages associated with the called directory number. If the SCP locates a wireline message associated with the called directory number, the SCP retrieves the wireline message from the wireline message database and creates a digital data message including the wireline message. Otherwise, if no wireline message associated with the called directory number is located, the SCP creates and sends a digital data message to the SSP instructing the SSP to process the call in a conventional fashion. The size of the wireline messages sent by the SCP to the SSP cannot be larger than about 480 to 600 characters.

After the SCP generates a digital data message including a wireline message, the SCP sends this digital data message to the SSP. If the SSP determines that the terminating station is in an off-hook condition, the SSP sends the wireline message to a terminating station using conventional call waiting techniques using in band signaling to send the text message to the terminating directory number. Otherwise, the SSP sends the wireline message to a terminating station between conventional first and second ring tones using FSK signals. The terminating station determines the contents of the wireline message and displays the message on a display device, such as a conventional liquid crystal display (LCD) screen. The terminating station may include a light emitting device (LED) or other visual indicator for alerting a subscriber to the fact that a wireline message has been sent to the subscriber.

In another embodiment, a wireline message may be composed of a ring tone that is used to identify the directory number from which an incoming call was placed. For instance, a subscriber can customize the ring tone corresponding to their associated directory number for the purpose of allowing another subscriber to identify the directory number from which the incoming call was placed. The ring tone can be composed of various tones, melodies and other sounds. This service allows the called subscriber to infer who placed the call.

Upon subscribing to the service, a directory number associated with the subscriber is stored within a first field in a wireline database that contains a list of directory numbers subscribing to the service. A subscriber may select a ring tone to associate with a directory number using the Internet to access web pages which offer many different ring tones and allow a subscriber to chose a ring tone. While reviewing a web page, the subscriber may select a ring tone and pay a fee for the ring tone. After completing the transaction, the ring tone is stored in the wireline message database associated with the SCP.

The wireline ring tone service operates by a call first being placed from an originating station to a directory number associated with a subscriber having compatible equipment. The call is routed through a local exchange network to the terminating SSP where a trigger is actuated. The call is held at the SSP, and a digital data message is created and sent to a SCP. Then the SCP searches the wireline message database for a wireline message composed of a ring tone that is associated with the calling directory number. If the SCP locates a wireline message associated with the calling directory number, the SCP retrieves the wireline message from the wireline message database and creates a digital data message including the wireline message. Otherwise, if no wireline message associated with the calling directory number is located in the wireline message database, the SCP instructs the SSP to process the call in a conventional fashion. The size of the wireline messages sent by the SCP to the SSP in a single transmission cannot be larger than the equivalent of about 480 to 600 characters.

After the SCP generates a digital data message including a wireline message, the SCP sends this digital data message to the terminating SSP. Once the SSP receives the digital data message containing the wireline message, the SSP sends the wireline message to the terminating station between the first and second ring tones using FSK signals. If the SSP determines that the terminating station is in an off-hook condition, the SSP does not send the wireline message to the terminating station.

The terminating station receives the FSK modulated signal and processes the signal. If the transmitted FSK signal includes a flag indicating that it is a ring tone, the terminating station processes the wireline message as a ring tone and plays the ring tone so that the ring tone can alert a subscriber that a call has been made from a particular directory number. The terminating station can be adapted to play the ring tone for various intervals and patterns.

An advantage of this invention is that text messages and graphics can be sent to people while they are in locations, such as their home or office, where people typically do not operate mobile devices having text messaging. Thus, this invention allows text messages to be sent to terminating stations where intended recipients are more likely to receive and respond to messages at certain times of the day or days of the week, such as on weekends, than through other devices.

Another advantage of this invention is that it allows a subscriber to customize the ring tone associated with the subscriber's assigned directory number so that called parties can identify the directory number from which the call was placed. Thus, a party that receives a call from a directory number having a custom ring tone can infer who placed the call based on the ring tone of the incoming call.

Yet another advantage of this invention is that it allows users to send and receive text messages from locations that do not have mobile service, or from locations where particular cellular providers do not have coverage.

These and other features and advantages of the present invention will become apparent after review of the following drawings and detailed description of the disclosed embodiments.

BRIEF DESCRIPTION OF THE DRAWINGS

The accompanying drawings, which are incorporated in and form a part of the specification, illustrate preferred embodiments of the presently disclosed invention(s) and, together with the description, disclose the principles of the invention(s). These several illustrative figures include the following.

DETAILED DESCRIPTION

Figure 1:
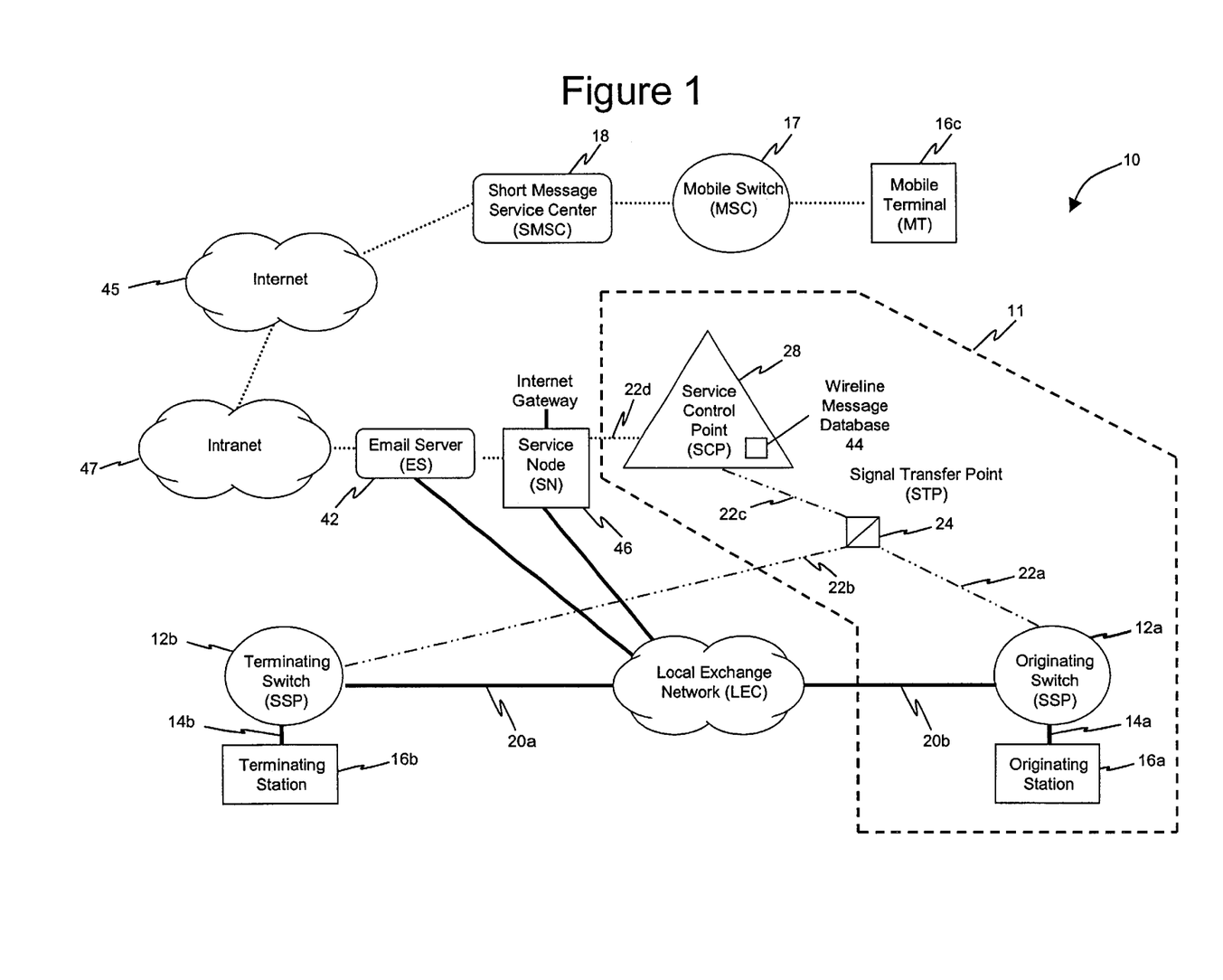
FIG. 1 is a schematic drawing of the operating environment of this invention.
Figure 2A:
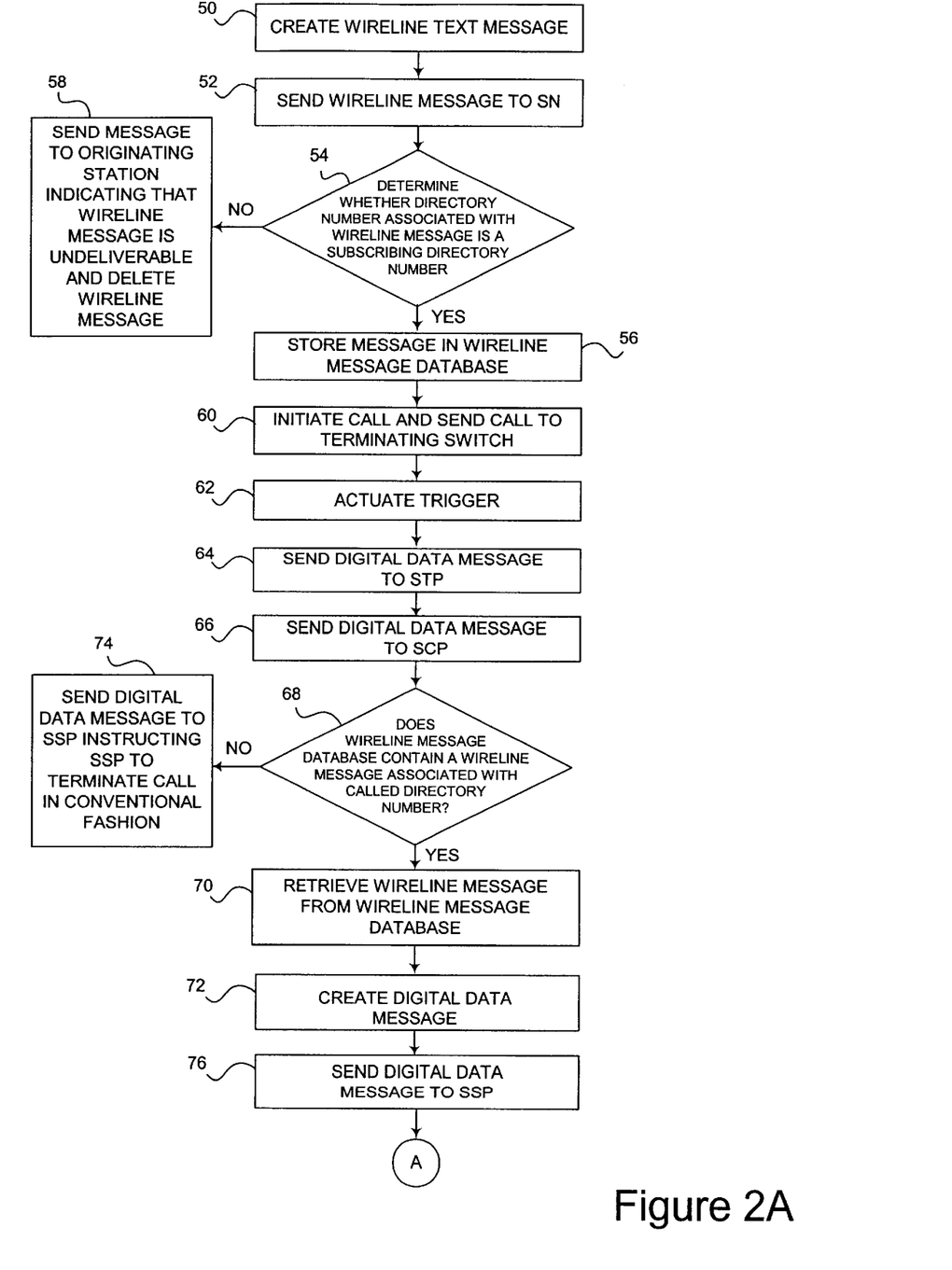
FIG. 2A is a flow chart of an embodiment of this invention used to send wireline messages composed of text messages.
Figure 2B:
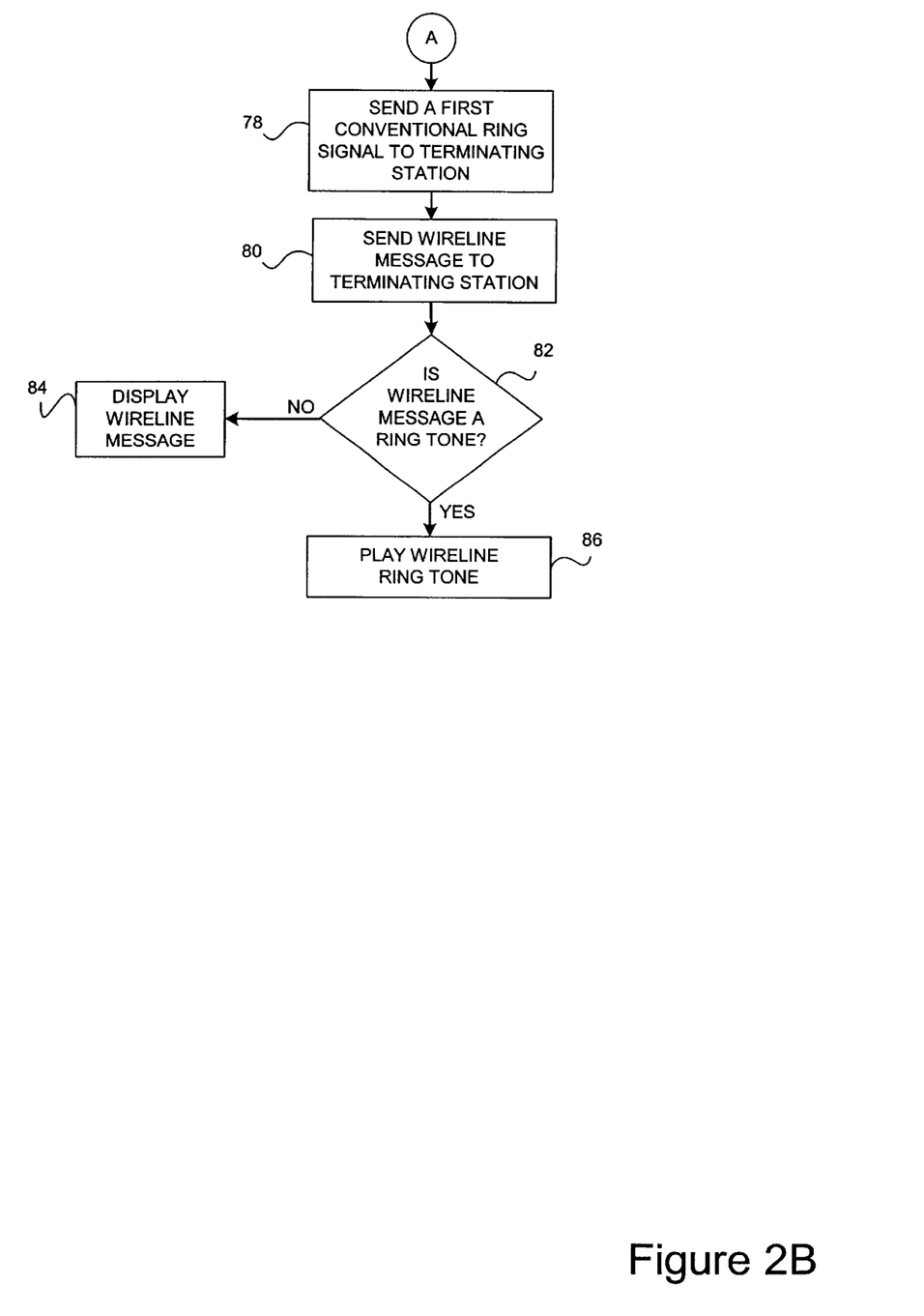
FIG. 2B is a continuation of the flow chart of FIG. 2A.
Figure 3:
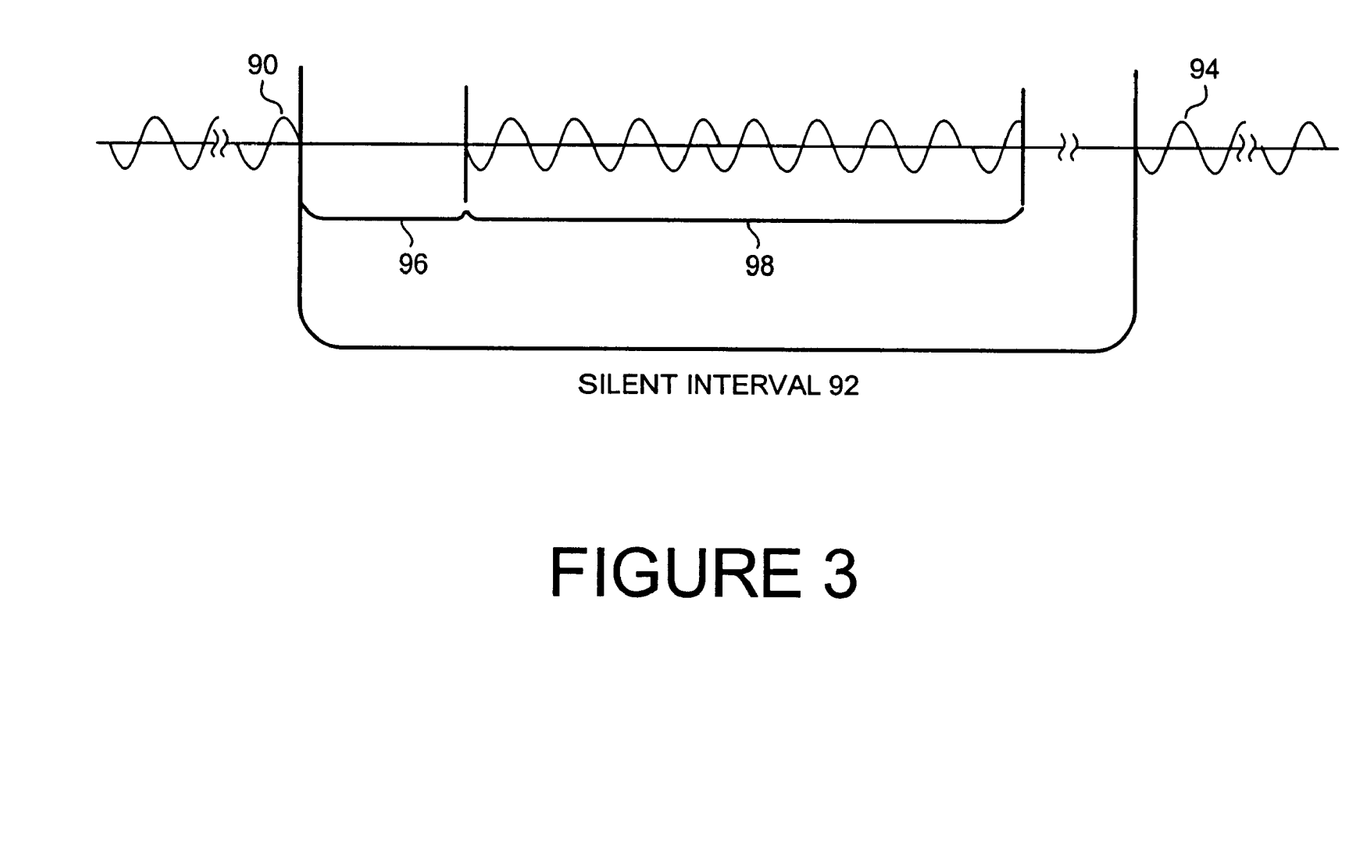
FIG. 3 is a schematic drawing depicting a wireline message being sent to a terminating station between conventional ring signals.
Figure 4A:
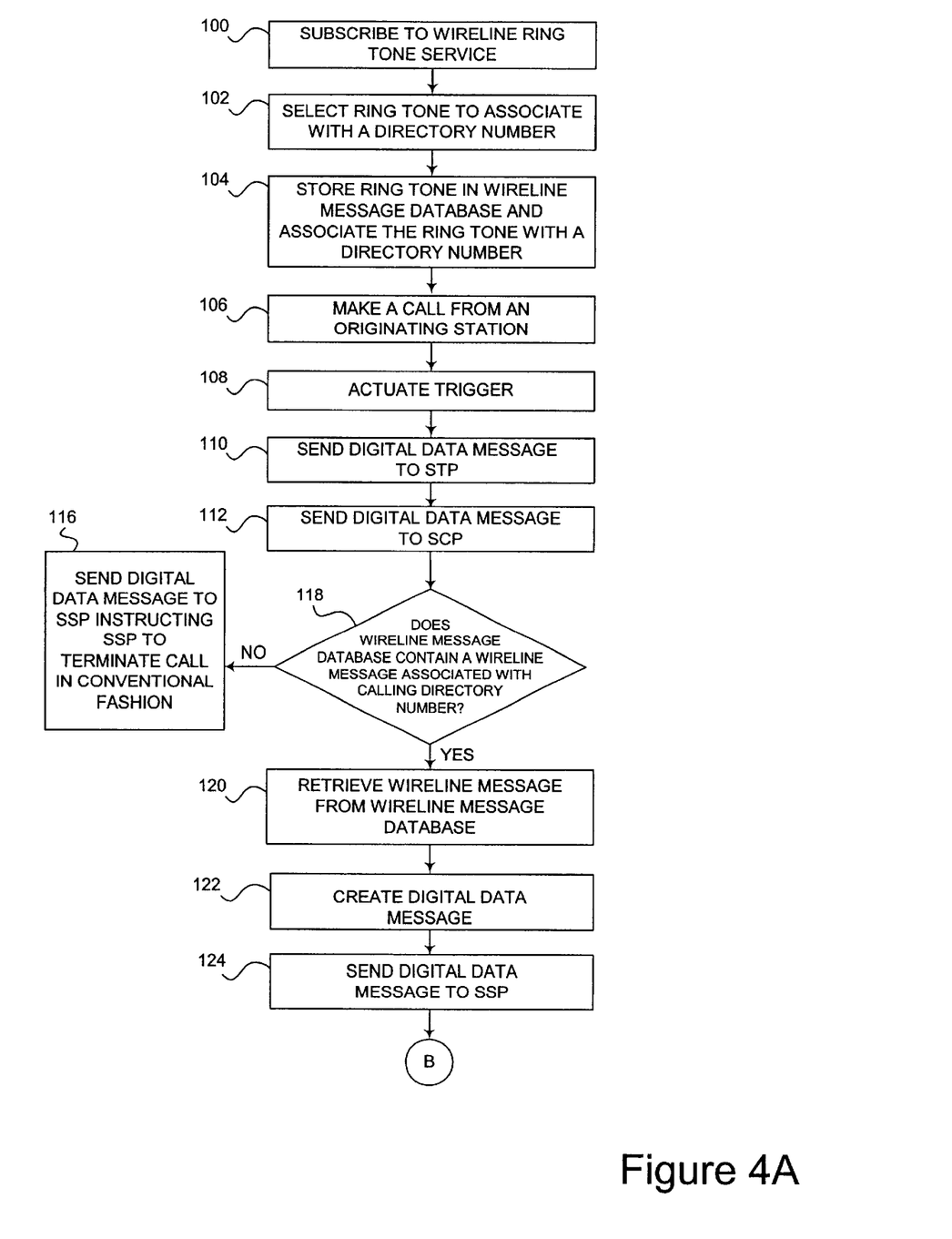
FIG. 4A is a flow chart of an embodiment of this invention used to send wireline messages composed of ring tones.
Figure 4B:
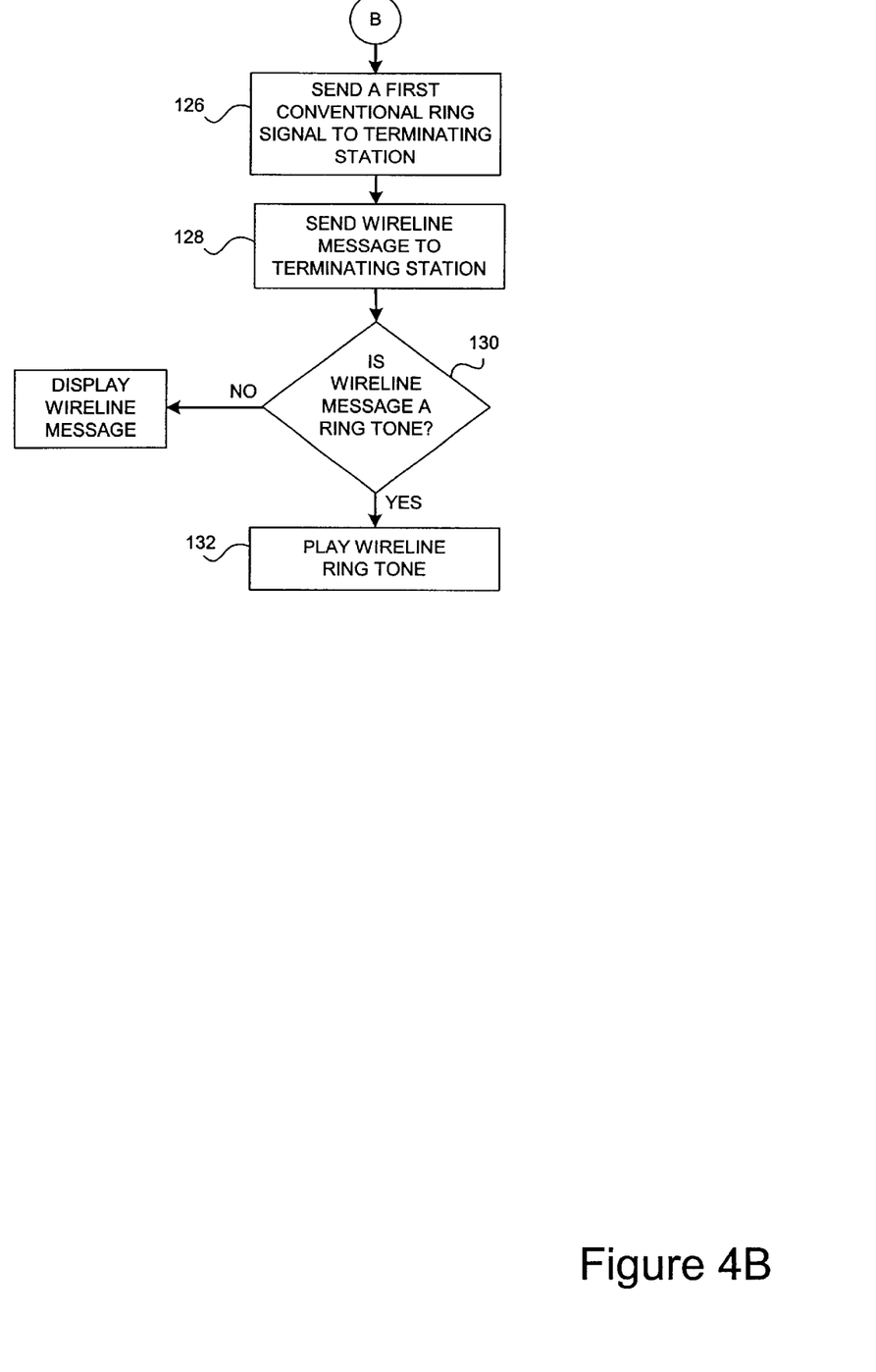
FIG. 4B is a continuation of the flow chart of FIG. 4A.

Referring now to the drawings, in which like numerals indicate like elements throughout the several figures, the preferred embodiments of the present invention are described below with reference to the appended drawings. Generally, FIG. 1 illustrates an operating environment of the present invention, including a PSTN and a wireline database in which incoming messages are stored and sent to a user's telephone for display at the telephone or other terminating device. FIGS. 2A and 2B schematically illustrate the process of retrieving a wireline message composed of a text message from a wireline message database and displaying the message on a display screen. FIG. 3 illustrates a wireline message being sent to a terminating station between conventional ring signals. FIGS. 4A and 4B schematically illustrate the process of retrieving a wireline message composed of a ring tone from a wireline database and playing the ring tone at a terminating station.

I. The Operating Environment

FIG. 1 is a functional block diagram of an intelligent switched telecommunications network for use in connection with the present invention. FIG. 1 illustrates a portion of a public switched telecommunications network (PSTN) 10 including an Advanced Intelligent Network (AIN) 11 of a typical local exchange carrier. The AIN 11, which is well known to those skilled in the art, is the operating environment of the preferred embodiments of the present invention. The AIN is described in the commonly-owned U.S. Pat. No. 5,438,568 to Weisser, Jr., which is incorporated herein by reference.

The AIN 11 includes a plurality of central office switches with some of the central office switches equipped with service switching points (SSPs). Representative SSPs are shown as originating switch, SSP 12a, and terminating switch, SSP 12b, in FIG. 1. The terms "SSP" and "switch" are used interchangeably herein and are understood to refer to a telecommunications switch for connecting voice channel circuits, including voice channel lines, commonly designated as 14.

Each SSP in the AIN 11 "services," or serves as an originating switch for a number of subscriber lines. An originating switch is typically directly connected with the subscriber lines serviced by the switch. Thus, the originating switch that services a subscriber's line is usually the first network element of the AIN 11 to process communications originating on the subscriber's line. The originating switch receives a communication originating on the subscriber line and implements further processing, such as routing the communication for connection with a terminating station. For example, the SSP 12a may receive a communication from an originating station 16a on the subscriber line 14a and route the communication for connection with a terminating station 16c in accordance with the packet-switched protocol of the PSTN 10. The details of communication routing are familiar to those skilled in the art and will not be further described herein. For more information regarding communication routing, see Bellcore specification TR-NWT-001284 Switching Systems Generic Requirements for AIN 0.1, incorporated herein by reference.

The switches of the AIN 11 are interconnected by a network of voice channel lines known as "trunks" commonly designated as 20 in FIG. 1. Trunks are the voice channel circuits that interconnect the central office switches to connect voice channel communications. The term "communication" is used herein to include all messages or communications that may be exchanged between two pieces of terminating equipment. In FIG. 1, the terminating equipment is represented by telephones that are commonly designated as 16. Although telephones are illustrated as the pieces of terminating equipment, those skilled in the art will understand that terminating equipment may include other communication devices, such as wireless telephones, facsimile machines, computers, modems, etc.

Each piece of terminating equipment in the PSTN 10 is preferably assigned a directory number. The term "directory number" is used herein in a manner consistent with its generally understood meaning of a number that is dialed or input by an calling party at an originating station to reach a terminating station associated with the directory number. A directory number, typically a seven or ten digit number, is commonly referred to as a "telephone number" and may be associated with a specific telephone line, such as the telephone line 14b shown in FIG. 1.

In the following description of the preferred embodiments, a communication is routed from an originating station 16a to a terminating station 16b. Routing the communication from the originating station 16a to the terminating station 16b involves the selection of a routing path for the communication and may also involve the implementation of one or more advanced network functions, such as call forwarding, calling party identification, prepaid or debit-card communication services, and the like. In fact, a wide variety of advanced network functions are presently available through the AIN 11. The ability of a typical SSP to provide these advanced network functions, however, is limited due to physical and other constraints. The AIN 11 therefore provides for increased information processing capability through a system of intelligent network elements that are functionally connected with the SSPs through a network of data links that are commonly designated as 22 in FIG. 1.

These intelligent network elements of the AIN 11 can communicate with each other, and with the SSPs of the network, via digital data messages transmitted over the network of digital data links 22. A SSP may be configured to interface with these intelligent network elements through the use of a "trigger." In general, a trigger serves as an indicator for the SSP to take certain action. The SSP is configured so that, when the SSP detects a predetermined set of conditions defining the trigger in association with a communication, the SPP creates an appropriate digital data message for transmission over the network of digital data links 22. The SSP may also suspend routing of the communication (i.e., hold the communication) until the SSP receives a reply to its message from an appropriate network element via the network of digital data links 22 instructing the SSP to take certain action. If the SSP receives no instructions within a certain amount of time, the SSP "times-out" and executes a default task for the communication.

The message created by a SSP in response to a trigger is known as a "query" message. A query message opens a "transaction" and the SSP generally holds the communication while the transaction remains open. The reply to the query message may be a "conversation" message or a "response" message. Conversation messages allow for bi-directional exchanges between network elements while the transaction remains open. A "response" message closes the transaction opened by the query message, and usually instructs the SSP to route the held communication for connection with a terminating station. A trigger is typically activated or deactivated at a SSP by another network element through an "update" message. Query messages, conversation messages, response messages, and update messages are standard types of messages defined by the AIN protocol. The details of the AIN protocol are well known to those skilled in the art and will not be further described herein. For more information regarding the AIN protocol, see Bellcore Specification TR-NWT-001284 Switching Systems Generic Requirements for AIN 0.1, which is referenced above.

Originating switch 12a is a SSP; however, originating switch 12a can include non-SSP central office switches (not shown) or other devices. It will be appreciated that a non-SSP switch may initially receive a communication on a subscriber line and pass the communication to another network element, such as the SSP 12a, for further processing. In this manner, advanced network functions available through the AIN 11 may be provided to wireless units and to subscriber lines that are directly connected to non-SSP switches.

Each switch in the AIN 11 is connected to a local signal transfer point (STP) via a data link. This arrangement is represented in FIG. 1 by the originating switch 12a, which is connected to the STP 24 by data link 22a. The STP 24 is a multi-port, high-speed packet switch that is programmed to respond to the routing information in the SS7 protocol, and route the packet to its destination.

Much of the intelligence of the AIN 11 resides in a plurality of local service control points (SCPs), represented by an SCP 28, which is connected to the STP 24 by an SS7 data link 22c. An SCP, such as the SCP 28, is a remotely programmable intelligent network element. As is known to those of skill in the art, SCPs are physically implemented by relatively powerful fault tolerant computers. Among the functions performed by SCPs is the maintenance of network databases that are used in providing subscribers with advanced network functions.

The AIN 11 thus provides subscribers with a selectable menu of advanced network functions. These advanced network functions are typically sold on a per-service basis, or in groups of services known as calling plans. Each subscriber may select a set of advanced network functions, or a calling plan, that suits the subscriber's needs. Moreover, each subscriber may generally select among a plurality of local advanced network functions as well as select among a plurality of long distance advanced network functions. The subscriber's local exchange carrier is generally responsible for maintaining accounting records for both local and long distance services, and producing unified billing statements for individual subscribers.

In order for the AIN to perform many of its functions, the AIN is coupled to a service node. The service node is adapted to receive information and perform a multitude of tasks based upon the information that the service node received. In FIG. 1, service node 46 is coupled to service control point 28, the local exchange network and Intranet 47. Service node 46 performs many functions that are described below, including acting as an Internet gateway. In one embodiment, the service node can be a short message server.

The operating environment of this invention is not limited to the relatively simple configuration shown in FIG. 1. Rather, FIG. 1 shows an illustrative portion of the PSTN 10 sufficient to describe the embodiments of the present invention. Many other network elements and interconnections, including SSP and non-SSP switches for servicing other pieces of terminating equipment are not shown in FIG. 1 but will be understood to be appropriate for use with the present invention.

II. Description of Preferred Embodiments

The invention is directed to systems for creating and sending a wireline message to a terminating station. The wireline message may include, but is not limited to, text messages, ring tones and other information. These messages may be created through many different means that are described below in more detail. Once created, the wireline message is stored within wireline database 44 that is associated with SCP 28. Upon a triggering event, the wireline message is retrieved from wireline database 44 and sent to a terminating station. The terminating station may be a wireline telephone adapted to receive a wireline message and to perform an action based upon the contents of the wireline message.

A. Wireline Text Message Service

One embodiment of the invention is directed to a system adapted to receive and transmit wireline data messages that may be composed of text which may include numerals, characters, and symbols; ring tones; and other items. The wireline data messages composed of text can be created at step 50 of FIG. 2A using a variety of devices, such as personal computers, mobile telephones, mobile terminals, wireline telephones, modems and other devices capable of communicating across a wireline or wireless network. In addition, the wireline messages can be created using conventional wireline telephones having programmable microprocessors that enable a user to use the alpha-numeric buttons on a conventional telephone to create alpha-numeric text messages. Preferably, these modified telephones have memory storage capabilities enabling the telephones to store wireline messages both created and received by the telephone. Wireline data messages composed of ring tones can be used to customize the ring tone associated with a wireline telephone so that all incoming calls to the customized telephone cause the telephone to generate the same customized ring tone.

The process of sending a wireline message to a directory number includes first sending the wireline message to service node 46 at step 52 through message server 42. Message server 42 has signaling interfaces that support both IP and SMS protocols (22x) and a voice trunk interface that allows dial access through a local exchange network and SSP 12*a* if the wireline message is created using an originating station coupled to SSP 12*a*, such as a telephone. However, if a wireline message is created using a wireless telephone or the like, the wireline message is sent to service node 46 through another system, such as a mobile network; not through SSP 12*a*. Specifically, the wireline message may be created using a mobile terminal 16*c* and sent through mobile switch 17 and short message service center 18. Regardless of the path through which the wireline message is initially routed, the wireline message is sent to message server 42 as an email message using a unique address, such as 4042132000, wherein the address is preferably identical to the directory number to which the wireline message is to be sent. Message server 42 sends the wireline message through Intranet 47 to service node 46 that is configured as an Internet Gateway with both signaling and voice path interfaces. In one embodiment, message server 42 and service node 46 can be combined in a single device.

Service node 46 receives the wireline message and determines whether the directory number associated with the wireline message is a subscriber of the wireline text service at step 54. In one embodiment, this is accomplished by service node 46 sending a query to SCP 28 to access a field within wireline message database 44 containing a list of the directory numbers subscribing to the wireline text service. If the wireline message database 44 contains the directory number, then the SCP 28 sends a response to service node 46 instructing service node 46 to send the wireline message to the wireline message database 44 at step 56. Otherwise, SCP 28 sends a response to service node 46 at step 58 instructing service node 46 to delete the message and send a message to the calling party indicating that the wireline message is undeliverable because the directory number is not a subscriber of the wireline text system.

Service node 46 passes the wireline message to the wireline message database 44 associated with SCP 28 for storage at step 56. Each wireline message stored in the wireline message database 44 is associated with the directory number to which the wireline message was sent. Wireline message database 44 is adapted to store wireline messages and to associate the wireline messages with a directory number that has subscribed to the wireline text message service. In addition, wireline message database 44 contains at least two fields: a first field for storing wireline messages and a second field for storing called directory numbers and associating these numbers with the wireline messages. Wireline database 44 may have a third field for storing directory numbers associated with subscribers of the wireline text message service.

After a wireline message has been created and sent to a directory number associated with a subscriber of the wireline message system, the wireline message is stored within the wireline message database 44 for a very brief period of time until a trigger, such as a conventional terminating attempt trigger (TAT), is actuated. In one embodiment, service node 46 initiates a call at step 60 to a particular directory number after service node 46 has passed a wireline message associated with the same directory number to wireline database 44 for storage and received confirmation that this message is stored and ready for delivery. The TAT is actuated at step 62 upon receiving the call from service node 46. Actuating the trigger causes the wireline message stored in wireline database 46 associated with SCP 28 to be sent to a terminating station, such as terminating station 16*b*.

When a call is placed to a directory number from service node 46, the call is first received by SSP 12*b*. The call is held at SSP 12*b*, and a digital data message is created and sent to SCP 28 through STP 24, as shown at steps 64 and 66. SCP 28 searches wireline message database 44 for wireline messages associated with the called directory number at step 68. If SCP 28 locates a wireline message associated with the called directory number, SCP 28 retrieves the wireline message from wireline message database 44 at step 70 and creates a digital data message at step 72 including the wireline message. Otherwise, if no wireline message associated with the called directory number is located, SCP 28 creates and sends a digital data message at step 74 to SSP 12*b* instructing SSP 12*b* to process the call in a conventional fashion. The size of the wireline messages sent by SCP 28 to SSP 12*b* in a single transmission cannot be larger than about 480 to 600 characters if a modem is used having a transmission rate of about 4.8 kilobytes per second.

After SCP 28 generates a digital data message at step 72 including a wireline message, SCP 28 sends this digital data message at step 76 to SSP 12*b*. Once SSP 12*b* receives the digital data message containing the wireline message, SSP 12*b* sends the wireline message to terminating station 16*b*. In one embodiment, the wireline message is sent to terminating station 16*b* between the first and second ring tones. Specifically, SSP 12*b* sends intermittent ring signals to a terminating station 16*b* associated with the called directory number. A first ring signal is sent to terminating station 16*b* at step 78 in FIG. 2B. First ring signal 90, as shown graphically in FIG. 3, is a conventional ring signal generally composed of a 20 hertz, 86-volt sine wave superimposed on—48 volts. First ring signal 90 occurs for a time period of about two seconds followed by a silent interval 92 of about four seconds in duration. These time periods are not limited to two and four seconds, respectively. Rather, these time periods may have other values.

During this silent interval 92 between first ring signal 90 and second ring signal 94, the wireline message is sent at step 80 to terminating station 16*b*. A frequency shift keyed (FSK) signal is used to transmit the wireline message from SSP 12*b* to terminating station 16*b*. The FSK signal is composed of two carrier frequencies, such as 2025 and 2225 hertz, which represent the low ("0") and high ("1") logic levels of the wireline message. The FSK signal is received in a balanced manner by terminating station 16*b*. The signal is transmitted from the SSP 12*b* using a conventional data transmitter known to those of ordinary skill in the art. The FSK signal is sent to terminating station 16*b* after a short time interval 96 has passed. This short time interval 96 lasts for example for approximately 300 to 350 milliseconds to allow terminating station 16*b* to reach a steady state condition. During short time interval 96, a single frequency unmodulated FSK signal 98 is sent to terminating station 16*b*, where FSK signal 96 is received by a conventional FSK modem.

Terminating station 16*b* receives the FSK modulated signal and processes the signal at step 82. Terminating station 16*b* determines the contents of the wireline message at step 82. Wireline data messages composed of text messages are displayed on a display device at step 84, such as a conventional liquid crystal display (LCD) screen. The LCD screen can be physically included within terminating station 16*b* or can be contained within a separate device that can be electronically coupled to terminating station 16*b* and positioned proximate to terminating station 16*b* or in another location. Terminating station 16*b* may be adapted to store wireline messages so that the messages can be reviewed at a later date. Additionally, terminating station 16*b* may include a light emitting device (LED) or other visual indicator for alerting a subscriber to the fact that a wireline message has been sent to the subscriber. The LED may be incorporated within the telephone or other device used for displaying a wireline message.

If the wireline data message includes a ring tone, the wireline data message can be played at 86 or stored within terminating station 16b. The ring tone may be used to change the default ring tone so that all incoming calls received by terminating station 16b cause terminating station to play the same customized ring tone. Thus, the conventional ring tone associated with terminating station 16b may be changed to any ring tone desired by the subscriber.

If SSP 12b determines that a terminating station 16b is busy with another call and in an off-hook condition, SSP 12b sends the wireline message to terminating station 16b using conventional in band signaling similar to signaling used to deliver caller ID data to off-hook subscribers with call waiting and display phones at step 80. Because there is a call already in progress, there is not a ring signal preceding the wireline message. Rather, SSP 12b sends an alerting signal to terminating station 16b. Upon receiving the alerting signal, the terminating station mutes the handset of the terminating station so that the terminating station user does not hear the FSK data transmission and to avoid interference from speech and other noises that could be picked up by the microphone of terminating station 16b. Concurrently, SSP 12b mutes audio signals sent to and received from originating station 12a so that the originating station user does not hear the data transmission. If terminating station 16b is ready to receive the wireline message, terminating station 16b responds to the alerting signal by sending an acknowledgement signal to SSP 12b. SSP 12b responds to the acknowledgement signal by sending the wireline message using a FSK signal. Immediately upon conclusion of sending the FSK signal to terminating station 16b, the terminating and originating stations are no longer muted and conversation can resume.

B. Calling Party Wireline Ring Tone Service

As mentioned above, wireline messages can be composed of ring tones that are used to identify the directory number from which an incoming call was placed. For instance, a subscriber can customize the ring tone corresponding to the subscriber's directory number for the purpose of allowing another subscriber to identify the directory number from which the incoming call was placed. The ring tone can be composed of various tones, melodies and other sounds. This function allows the called subscriber to infer who placed the call. In one embodiment, the wireline ring tones can be offered to wireline telephone users as an additional option or service that can be made available to a directory number upon paying for instance, a monthly fee, to enable this service. The service associates a particular ring tone with a calling directory number.

Upon subscribing to the service at step 100 of FIG. 4A, a directory number associated with the subscriber is stored within a first field in wireline database 44 that contains a list of directory numbers subscribing to the service. A subscriber may select a ring tone at step 102 to associate with a directory number using the Internet to access ring tone provider web pages which offer many different ring tones. These web pages allow a subscriber to chose a ring tone. While reviewing a web page, the subscriber selects a ring tone and typically pays a fee for the ring tone. After completing the transaction, the ring tone provider sends the ring tone to message server 42. Message server 42 then sends the ring tone through service node 46 to wireline message database 44 that is associated with SCP 28. The ring tone is stored within the wireline database at step 104 in a second field and is associated with a subscribing directory number that is located in the first field. In another embodiment, the message server 42 is included within service node 46.

The wireline ring tone service is used by a call being placed from originating station 16a to a directory number at step 106 associated with terminating station 16b. The call is routed through a local exchange network to SSP 12b where a trigger is actuated at step 108. A trigger is coupled only with directory numbers that are subscribers of the ring tone service. The call is held at SSP 12b, and a digital data message is created and sent to SCP 28 through STP 24, as shown at steps 110 and 112. SCP 28 searches wireline message database 44 for a wireline message composed of a ring tone that is associated with the calling directory number at step 118. If SCP 28 locates a wireline message associated with the calling directory number, SCP 28 retrieves the wireline message from the wireline message database at step 120 and creates a digital data message at step 122 including the wireline message. Otherwise, if no wireline message associated with the calling directory number is located in wireline message database 44, SCP 28 creates and sends a digital data message to SSP 12b at step 116 instructing SSP 12b to process the call in a conventional fashion. The size of the wireline messages sent by SCP 28 to SSP 12b in a single transmission cannot be larger than about 480 to 600 characters.

After SCP 28 generates a digital data message at step 122 including a wireline message, SCP 28 sends this digital data message to SSP 12b at step 124. Once SSP 12b receives the digital data message containing the wireline message, SSP 12b sends the wireline message to terminating station 16b. If SSP 12b determines that a terminating station 16b is busy with another call and in an off-hook condition, SSP 12b does not send the wireline message to terminating station 16b. In one embodiment, the wireline message is sent to terminating station 16b between the first and second ring tones. Specifically, SSP 12b sends intermittent ring signals to a terminating station 16b associated with the called directory number. A first ring signal is sent to terminating station 16b at step 126 in FIG. 4B. The wireline message composed of a ring tone is sent to terminating station 16b at step 128 in the same manner described above for the wireline text message.

Terminating station 16b receives the FSK modulated signal and processes the signal at step 130. In one embodiment, the FSK signal includes a flag that alerts terminating station 16b that the wireline message is composed of a ring tone. Terminating station 16b determines the contents of the wireline message at step 130. If the wireline message associated with a calling directory number is composed of a ring tone, as indicated by the presence of a flag, terminating station 16b plays the ring tone at step 132 so that the ring tone can be heard by a subscriber and thereby alert the subscriber that a call has been made from a particular directory number.

Terminating station 16b can be adapted to play the ring tone for various intervals. For instance, the ring tone may be played as a substitute for conventional ring signals after the first conventional ring signal until terminating station 16b is placed in an off-hook state or the originating station returns to an on-hook state. Thus, terminating station 16b plays a conventional ring signal followed by a silent interval when terminating station 16b receives the FSK signal including the wireline message. Once transmission of the FSK signal is complete, terminating station 16b begins continuously playing the custom ring tone. In another embodiment, terminating station 16b may play the ring tone between conventional second and third ring tones and allow remaining conventional ring tones, four, five, et cetera, to play in the conventional fashion without a custom ring tone being played between them. In yet another embodiment, the custom ring tone can be played between conventional ring tones two and three and each silent interval thereafter. In still another embodiment, the custom ring tone can be substituted for the conventional ring tones played after the first conventional ring tone so that the custom ring tone is played for a short time period, such as about two seconds, and followed by a silent interval before repeating the custom ring tone.

The foregoing is provided for purposes of illustrating, explaining, and describing embodiments of this invention. Modifications and adaptations to these embodiments will be apparent to those skilled in the art and may be made without departing from the scope or spirit of this invention or the following claims.

We claim:

1. A system for providing wireline text messaging service to a terminating station, comprising:
   a service switching point for sending a first data message associated with a directory number to a service control point and for receiving a second data message that includes a wireline text message from the service control point; and
   the service control point for receiving the first data message from the service switching point, accessing a wireline message database to determine whether the wireline text message stored in the wireline message database is associated with the directory number, creating the second data message using the wireline text message, and sending the second data message to the service switching point.

2. The system as set forth in claim 1, further comprising the wireline message database associated with the service control point and adapted to store the wireline text message associated with the directory number.

3. The system as set forth in claim 2, wherein the wireline message database comprises a first field for storing wireline text messages associated with called directory numbers, a second field for storing called directory numbers associated with the wireline text messages, and a third field for storing directory numbers associated with the subscribers.

4. The system as set forth in claim 1, further comprising a service node for sending a wireline text message to the wireline message database, for initiating a telephone call, and for sending the telephone call to the service switching point triggering transmission of the first data message to the service switching point.

5. The system as set forth in claim 1, further comprising a terminating station adapted to receive the wireline text message associated with the second data message and sent from the service switching point.

6. The system as set forth in claim 5, further comprising a display screen incorporated within the terminating station and adapted to display the second data message.

7. The system as set forth in claim 5, further comprising a device having a display screen for displaying the second data message, wherein the device is electrically coupled to the terminating station.

8. The system as set forth in claim 5, wherein the terminating station includes a light emitting device for signaling receipt of the wireline text message associated with the second data message.

9. The system as set forth in claim 1, wherein the service switching point further comprises a trigger for actuating a process for sending the first data message to the service control point.

10. The system as set forth in claim 9, wherein the trigger is adapted to be actuated upon receiving an incoming call placed to a directory number.

11. A method for providing wireline text messaging service at a terminating station, comprising:
    receiving a wireline text message associated with a directory number;
    sending the wireline text message to a wireline message database;
    storing the wireline text message in the wireline message database;
    initiating a telephone call that is directed to the directory number at a service node;
    sending the telephone call to a service switching point;
    actuating a trigger;
    creating a first data message at the service switching point;
    sending the first data message to a service control point to access the wireline text message associated with the directory number and stored in a wireline message database associated with the service control point;
    extracting the wireline text message from the wireline message database;
    creating a second data message comprising the wireline text message;
    sending the second data message to the service switching point; and
    sending the wireline text message to the terminating station.

12. The method as set forth in claim 11, wherein actuating the trigger comprises receiving the telephone call initiated by the service node.

13. The method as set forth in claim 11, wherein sending the wireline text message to a terminating station comprises sending a first ring signal indicating an incoming call to the terminating station and sending the wireline text message to the terminating station during a silent interval following the first ring signal.

14. The method as set forth in claim 13, further comprising displaying the wireline text message on a display screen.

15. The method as set forth in claim 14, wherein displaying the wireline text message on a display screen comprises displaying the wireline text message on a display screen incorporated within the terminating station.

16. The method as set forth in claim 14, wherein displaying the wireline text message on a display screen comprises displaying the wireline text message on a display screen incorporated within a device electrically coupled to the terminating station.

17. The method as set forth in claim 11, wherein sending the wireline message to a wireline message database comprises:
    accessing the wireline message database;
    determining whether the wireline message database contains the directory number associated with the wireline text message; and
    if the wireline message database includes the directory number associated with the wireline text message, then storing the wireline text message within the wireline message database;

otherwise, deleting the wireline text message, creating a return wireline message informing a party who sent the wireline text message that the wireline text message is undeliverable and sending the return wireline message.

18. The method as set forth in claim 11, wherein extracting the wireline text message from the wireline message database comprises:

determining whether the wireline message database includes a wireline text message associated with the directory number; and if the wireline message database includes the wireline text message associated with the calling directory number, then creating the second data message including the wireline text message associated with the directory number;

otherwise, creating the second data message instructing the service switching point to terminate the telephone call in a conventional manner.

19. A system for providing wireline text messaging service to a terminating station, comprising:

a service control point for receiving a wireline text message, storing the wireline text message in a wireline message database, associating the wireline text message with a called directory number; and sending the wireline text message to the terminating station; and a wireline database coupled to the service control point for receiving the wireline text message, the wireline database being adapted to store wireline text messages associated with called directory numbers.

* * * * *